UNITED STATES PATENT OFFICE.

DAVID SPENCE, OF NORWALK, CONNECTICUT.

PROCESS FOR REMOVING THE COMBINED SULFUR FROM VULCANIZED RUBBER.

1,235,852.  Specification of Letters Patent.  Patented Aug. 7, 1917.

No Drawing. Original application filed June 27, 1914, Serial No. 847,706. Divided and this application filed December 20, 1916. Serial No. 137,954.

*To all whom it may concern:*

Be it known that I, DAVID SPENCE, a subject of the King of Great Britain and Ireland, residing at Norwalk, in the county of Fairfield and State of Connecticut, have invented certain new and useful Improvements in Processes for Removing the Combined Sulfur from Vulcanized Rubber, of which the following is a specification.

This invention relates to a process for removing the combined sulfur from vulcanized rubber, and its novelty consists in the several successive steps employed to secure the desired result.

This application, by a requirement of the Patent Office, is a division of my application for Letters Patent of the United States, Serial No. 847,706, filed June 27th, 1914.

In the principal application of which this is a division, I have described a method of treating vulcanized rubber which consists briefly first in removing therefrom in any usual manner the uncombined sulfur, second dissolving the vulcanized rubber so freed from impurities in a suitable solvent, and third while in such solution, subjecting it at a suitable temperature to the action of a reagent capable of uniting with the sulfur when freed from the rubber, the reaction taking place in the presence of a vulcanizing accelerator. It was also stated in that application that the reagent acting as the vulcanizing accelerator and the reagent capable of uniting with the free sulfur might be identical, that is, one reagent might perform the double function. And it was further stated that the reaction should take place under anhydrous conditions. The principle underlying the process of the described application is that reagents capable of accelerating the union of sulfur with rubber to form vulcanized rubber, are generally speaking capable of accelerating the reverse reaction when it is desired to destroy the combination between the sulfur and the rubber.

Among the reagents suitable for use in carrying out the process is caustic soda. For instance, the following process has been performed:—Ten parts of vulcanized rubber waste from which the free sulfur had been extracted, was heated with twenty-five parts of powdered anhydrous caustic soda and two hundred parts of xylol for three hours at 140° centigrade in an autoclave provided with means for agitation. The rubber waste is thus first dissolved or partially dissolved in the xylol and the powdered alkali is added while vigorous agitation is maintained throughout the mass. The solution was then centrifuged till free from insoluble sulfids and other insoluble matter and was then treated with a small quantity of hydrochloric acid to decompose the last traces of alkali and alkaline sulfids present, and the rubber was precipitated from the solution by acetone. It might be isolated by any other well known means. By repeated boiling out with water, followed by thorough washing with cold water on the mill, a tough elastic sheet of rubber-like substance was obtained. In the case of the sample of vulcanized rubber which contained 4.1% of combined sulfur treated in this way, the combined sulfur was reduced to 1.2%, that is 70% of the combined sulfur was removed in one operation. It is obvious that by a further similar treatment a further portion of such combined sulfur might be removed.

I claim:

1. The method of removing combined sulfur from vulcanized rubber which consists in treating the dissolved rubber with anhydrous or nearly anhydrous caustic alkali.

2. The method of removing combined sulfur from vulcanized rubber which consists in dissolving the rubber in a solvent, and treating it with an excess of finely divided approximately anhydrous caustic alkali.

3. The method of removing combined sulfur from vulcanized rubber which consists in treating it, in solution in xylol, with an excess of finely divided caustic soda, in the substantial absence of moisture.

4. The process of removing combined sulfur from vulcanized rubber, which consists first in removing therefrom in any usual manner the uncombined sulfur, second dissolving the vulcanized rubber so freed from impurities in a suitable solvent, third adding thereto at a suitable temperature anhydrous caustic alkali under conditions of agitation, and fourth precipitating the rubber from the solution.

5. The process of removing combined sulfur from vulcanized rubber, which consists in subjecting the vulcanized rubber in solution to the action of anhydrous caustic alkali in a finely divided state at a suitable temperature and under conditions of agitation adding a suitable quantity of an acid to neutralize the alkaline ingredients remaining in the solution, and precipitating the rubber from the solution.

6. The process of treating vulcanized rubber, which consists first in removing therefrom the uncombined sulfur, second dissolving the residue in a suitable solvent and subjecting the dissolved rubber to the action of an anhydrous or nearly anhydrous caustic alkali.

In witness whereof I affix my signature.

DAVID SPENCE.